United States Patent
Voda et al.

(10) Patent No.: US 11,187,467 B2
(45) Date of Patent: Nov. 30, 2021

(54) HEAT EXCHANGE SYSTEM AND METHOD OF ASSEMBLY

(71) Applicant: Air Products and Chemicals, Inc., Allentown, PA (US)

(72) Inventors: Joseph E. Voda, Tomball, TX (US); Adam R. Garcia, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 17/274,363

(22) PCT Filed: Oct. 8, 2020

(86) PCT No.: PCT/US2020/054794
§ 371 (c)(1),
(2) Date: Mar. 8, 2021

(87) PCT Pub. No.: WO2021/072082
PCT Pub. Date: Apr. 15, 2021

(65) Prior Publication Data
US 2021/0333050 A1     Oct. 28, 2021

Related U.S. Application Data

(60) Provisional application No. 62/912,246, filed on Oct. 8, 2019.

(51) Int. Cl.
*F28D 7/02* (2006.01)
*F28D 7/00* (2006.01)
(Continued)

(52) U.S. Cl.
CPC ........... *F28D 7/022* (2013.01); *B21D 53/027* (2013.01); *B21D 53/04* (2013.01); *B21D 53/06* (2013.01);
(Continued)

(58) Field of Classification Search
CPC .. F28F 2280/04; Y10T 29/53117; B23P 15/26
See application file for complete search history.

(56) References Cited

U.S. PATENT DOCUMENTS 2,475,109 A    7/1949  Pendleton
2,615,687 A   10/1952  Simmons
(Continued)

FOREIGN PATENT DOCUMENTS

EP      1367350 A1    12/2003

OTHER PUBLICATIONS

European International Search Report and Written Opinion of the International Searching Authority, dated Jan. 22, 2021, for PCT/US2020/054794.

*Primary Examiner* — Jason L Vaughan
(74) *Attorney, Agent, or Firm* — Amy Carr-Trexler

(57) ABSTRACT

A method of constructing a coil wound heat exchange module and transporting and installing the coil wound heat exchange module at a plant site, such as an natural gas liquefaction plant. A module frame is constructed and attached to a heat exchanger shell prior to telescoping of a coil wound mandrel into the shell. The module frame includes a lug and two saddles that remain attached to the shell throughout the process and when the heat exchanger is operated. The lug and saddles are constructed and located to stabilize the shell during construction, telescoping and transport (when in a horizontal orientation), and when the shell is installed at the plant site (in a vertical orientation). The lugs and saddles are adapted to allow for thermal expansion and contraction of the shell when it is transitioned from ambient to operating temperature and vice versa.

17 Claims, 14 Drawing Sheets

(51) Int. Cl.
  *B23P 15/26* (2006.01)
  *B21D 53/04* (2006.01)
  *B21D 53/06* (2006.01)
  *B21D 53/02* (2006.01)
  *F25J 1/02* (2006.01)

(52) U.S. Cl.
  CPC ............ *B23P 15/26* (2013.01); *F28D 7/0066* (2013.01); *F25J 1/0259* (2013.01); *F25J 1/0262* (2013.01); *F25J 2290/42* (2013.01)

(56) References Cited

U.S. PATENT DOCUMENTS

| | | | | |
|---|---|---|---|---|
| 3,048,280 A | * | 8/1962 | Huff | B23P 19/024 29/726.5 |
| 3,075,664 A | * | 1/1963 | Collings | B66C 1/24 414/626 |
| 3,126,103 A | * | 3/1964 | Postlewaite et al. | B66C 1/00 29/726.5 |
| 3,180,498 A | * | 4/1965 | Postlewaite | B23P 19/024 29/726.5 |
| 3,239,076 A | * | 3/1966 | Huff | B66C 1/00 29/726.5 |
| 3,239,077 A | * | 3/1966 | Huff | B23P 19/024 29/726.5 |
| 3,257,001 A | * | 6/1966 | Postlewaite | B23P 19/024 29/726.5 |
| 3,510,012 A | * | 5/1970 | Van Meteren | B23P 19/024 29/726.5 |
| 3,567,044 A | * | 3/1971 | Travis | B23P 19/024 29/726.5 |
| 3,658,191 A | * | 4/1972 | Murphy | B66C 1/00 414/745.3 |
| 3,765,544 A | * | 10/1973 | Murphy | B23P 19/024 414/745.3 |
| 3,935,951 A | * | 2/1976 | Claus | B23P 19/024 29/726.5 |
| 3,954,187 A | * | 5/1976 | van der Woerd | B23P 19/024 29/726.5 |
| 3,958,698 A | * | 5/1976 | van der Woerd | B23P 19/024 414/745.3 |
| 4,192,053 A | * | 3/1980 | Blanco | F22B 37/002 29/890.031 |
| 4,199,857 A | * | 4/1980 | Meuschke | G21F 9/28 29/426.3 |
| 4,227,854 A | * | 10/1980 | Coffey | B23P 19/024 29/726.5 |
| 4,323,398 A | * | 4/1982 | Simon | F28G 15/02 134/18 |
| 4,346,759 A | | 8/1982 | Cohen et al. | |
| 4,562,884 A | | 1/1986 | Moller et al. | |
| 4,869,638 A | * | 9/1989 | Krajicek | B23P 19/024 414/745.3 |
| 4,970,867 A | | 11/1990 | Herron et al. | |
| 5,032,054 A | * | 7/1991 | Krajicek | B23P 19/024 414/745.3 |
| 5,188,170 A | | 2/1993 | Giberson | |
| 5,613,373 A | | 3/1997 | Grenier | |
| 6,202,305 B1 | | 3/2001 | Bracque et al. | |
| 2018/0299198 A1 | | 10/2018 | Poulin et al. | |

* cited by examiner

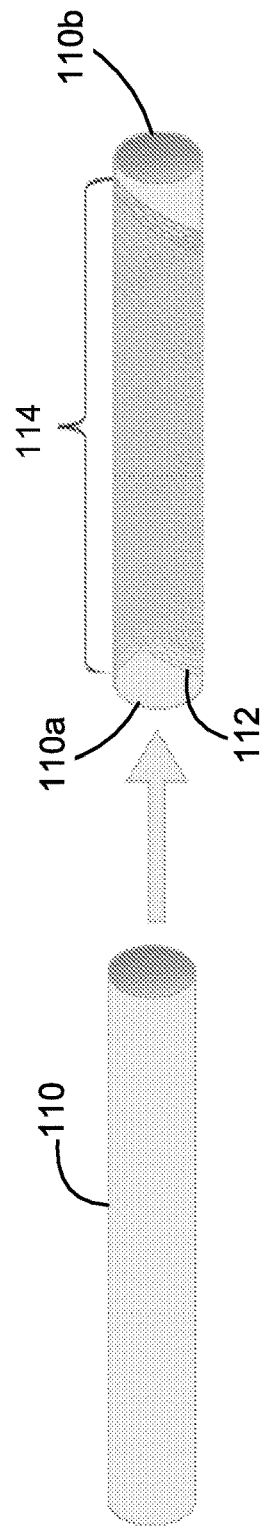
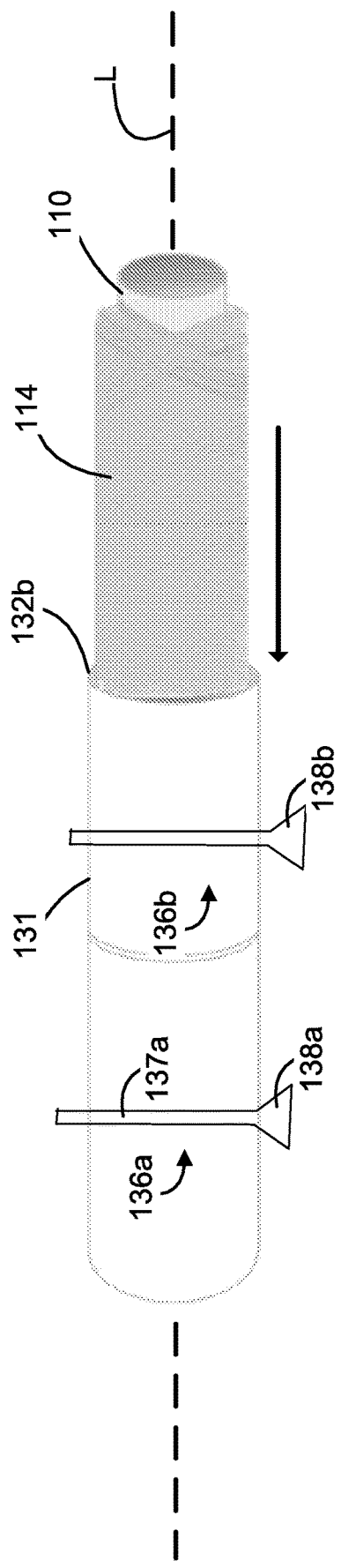
FIG. 1A
FIG. 1B

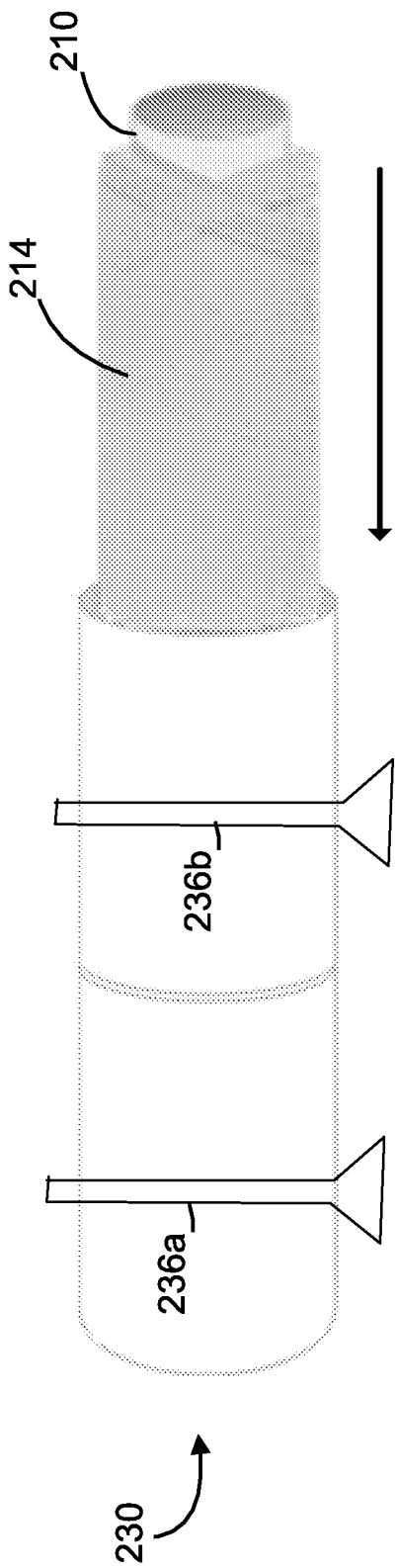
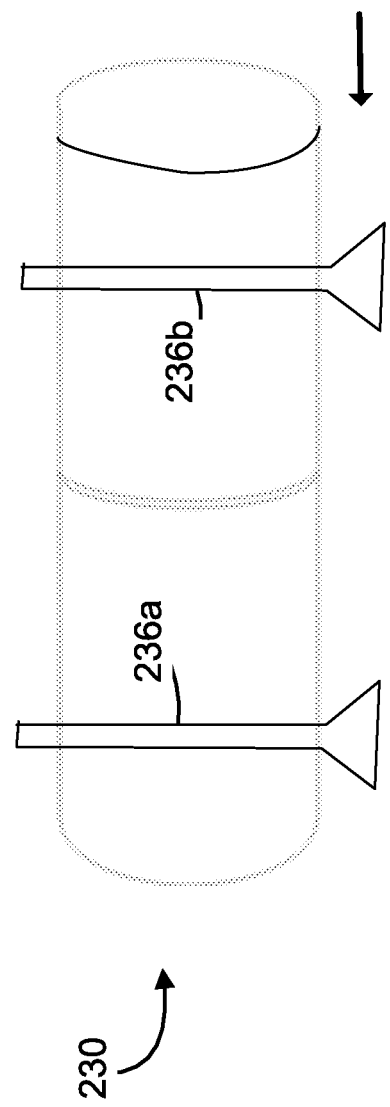
FIG. 2A
FIG. 2B

HEAT EXCHANGE SYSTEM AND METHOD OF ASSEMBLY

FIELD OF THE INVENTION

The present disclosure relates generally to heat exchangers and cryogenic equipment, and, more particularly, to assembling heat exchangers and cryogenic equipment.

BACKGROUND

Conventional methods of assembling and installing a coil wound heat exchanger ("CWHE") are time consuming and lead to increased manufacturing duration. Under a typical method, the shell supported by set of shop saddles while a wound bundle is telescoped into the pressure containing shell ("shell"). After the wound bundle is telescoped into the shell, the CWHE is lifted onto a transport vehicle, where it is strapped to a set of transport saddles and transported in a horizontal position. When the CWHE arrives at a plant site, it is erected into a vertical position and a support frame is built around it. The support frame includes structural elements that are designed to provide vertical support for the CWHE, as well as to account for wind and seismic loads.

Conventional CWHE assembly methods require that piping connections, electrical connections, instrumentation, walking platforms, etc. be installed after the CWHE has been erected at the plant site and at least some of the support frame has been built. This results in relatively long construction timelines and means that the installation of these items must take place outdoors at the plant site. In addition, three different sets of structures are used to support the CWHE during the various stages of construction and lifting equipment must be directly attached to the shell when the shell is lifted onto the transport vehicle and when it is erected at the plant site.

There is a need for an improved method of assembling and installing a CHWE.

SUMMARY

Improved methods are provided herein for assembling a heat exchanger and cryogenic equipment, as well as an improved module frame and structure for connecting the heat exchanger to the module frame.

In one aspect, the improvement comprises the following method step:
(a) forming a first mandrel;
(b) forming a first wound bundle onto the first mandrel to form a first coil wound mandrel by winding tubing around the first mandrel;
(c) providing a first portion of a first heat exchanger shell, the first portion having a first open face and a first shell longitudinal axis that extends parallel to a largest dimension of the first heat exchanger shell;
(d) attaching the first portion of the heat exchanger shell to a first module frame with at least two connecting members that are rigidly attached to the first heat exchanger shell to form a first heat exchange module, the first module frame comprising a plurality of columns connected by cross-members;
(e) after performing step (d), telescoping the first coil wound mandrel into the first portion of the first heat exchanger shell through the first open face while the first shell longitudinal axis is in a substantially horizontal orientation;
(f) after performing step (e), closing the first open face of the first heat exchanger shell;
(g) after performing step (f), transporting the first heat exchange module to a plant site; and
(h) after performing step (g), mounting the first heat exchange module at the plant site with the first shell longitudinal axis in a substantially vertical orientation, wherein the first heat exchanger is suspended in a fixed position within the first module frame by the at least two connecting members.

In another aspect, the improvement comprises a heat exchange module comprising a coil wound heat exchanger having a shell having an outer surface, a top end, bottom end, a shell longitudinal axis, and a shell length extending along the longitudinal axis from the top end to the bottom end (the shell length being a largest dimension of the shell). The heat exchange module further comprises a module frame having a plurality of columns connected by cross-members, a lug that is rigidly attached to the shell and the module frame; and, a first saddle that is rigidly attached to the shell and is connected to the module frame by a plurality of first saddle joints. Each of the plurality of first saddle joints is adapted to accommodate for thermal expansion and contraction of the shell by enabling the first saddle to move relative to the module frame in a direction that is parallel to the longitudinal axis of the shell.

In yet another aspect, the improvement comprises a plant for liquefying a hydrocarbon feed gas in which the main heat exchanger is constructed, transported to the plant side, and installed using the methods disclosed herein and the module frame structure disclosed herein.

BRIEF DESCRIPTION OF THE DRAWINGS

Embodiments are described herein making reference to the appended drawings.

FIGS. 1A-1E illustrates a method of assembling a single shell heat exchanger assembly according to one or more embodiments;

FIGS. 2A-2C illustrates a method of assembling a multiple shell heat exchanger assembly according to one or more embodiments;

DETAILED DESCRIPTION

Figure 1C:
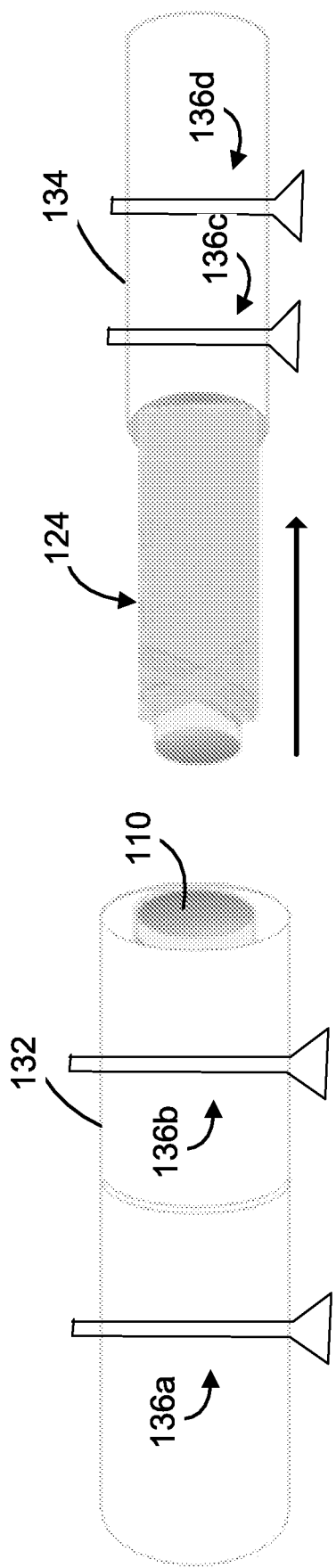

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

The following detailed description is not to be taken in a limiting sense. In this regard, directional terminology, such as "top", "bottom", "lower," "upper," "below", "above", "front", "behind", "back", "leading", "trailing", "horizontal," "vertical," etc., may be used with reference to the orientation of the figures being described. Terms including "inwardly" versus "outwardly," "longitudinal" versus "lateral" and the like are to be interpreted relative to one another or relative to an axis of elongation, or an axis or center of rotation, as appropriate. Because parts of embodiments may be positioned in a number of different orientations, the directional terminology is used for purposes of illustration and is in no way limiting. It is to be understood that other embodiments may be utilized and structural or logical changes may be made without departing from the scope defined by the claims.

Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise, and includes terms such as "directly" coupled, secured, etc. The term "operatively coupled" is such an attachment, coupling, or connection that allows the pertinent structures to operate as intended by virtue of that relationship.

The term "substantially" may be used herein to account for manufacturing tolerances (e.g., within 5%) that are deemed acceptable in the industry without departing from the aspects of the embodiments described herein. In the context of an orientation, the term "substantially" means within 5 degrees of that orientation. For example, "substantially vertical" means within 5 degrees in either direction of vertical.

As used herein, the term "orientation", in reference to an orientation of a structure, is intended to mean that the orientation of the structure is defined by the structure's longest dimension.

The term "fluid flow communication," as used in the specification and claims, refers to the nature of connectivity between two or more components that enables liquids, vapors, and/or two-phase mixtures to be transported between the components in a controlled fashion (i.e., without leakage) either directly or indirectly. Coupling two or more components such that they are in fluid flow communication with each other can involve any suitable method known in the art, such as with the use of welds, flanged conduits, gaskets, and bolts. Two or more components may also be coupled together via other components of the system that may separate them, for example, valves, gates, or other devices that may selectively restrict or direct fluid flow.

The term "conduit," as used in the specification and claims, refers to one or more structures through which fluids can be transported between two or more components of a system. For example, conduits can include pipes, ducts, passageways, and combinations thereof that transport liquids, vapors, and/or gases.

The term "natural gas", as used in the specification and claims, means a hydrocarbon gas mixture consisting primarily of methane.

The term "mixed refrigerant" (abbreviated as "MR"), as used in the specification and claims, means a fluid comprising at least two hydrocarbons and for which hydrocarbons comprise at least 80% of the overall composition of the refrigerant.

The terms "bundle" and "tube bundle" are used interchangeably within this application and are intended to be synonymous.

The term "compression circuit" is used herein to refer to the components and conduits in fluid communication with one another and arranged in series (hereinafter "series fluid flow communication"), beginning upstream from the first compressor or compression stage and ending downstream from the last compressor or compressor stage. The term "compression sequence" is intended to refer to the steps performed by the components and conduits that comprise the associated compression circuit.

As used herein, the term "vertical orientation" is intended to mean that a structure's longest dimension is oriented vertically.

As used herein, the term "horizontal orientation" is intended to mean that a structure's longest dimension is oriented horizontally.

As used herein, the term "rigidly attached" is intended to mean that a structure is mechanically coupled to the other structure in a way that prevents any motion between the two structures, such as bolting or welding. Unless otherwise specified, a first element is considered to be "rigidly attached" to a second element even if the attachment is indirect (i.e., additional elements are located between the first and second elements).

As used herein, the term "ambient temperature" refers to the air temperature of the environment surrounding the equipment.

Figure 1D:
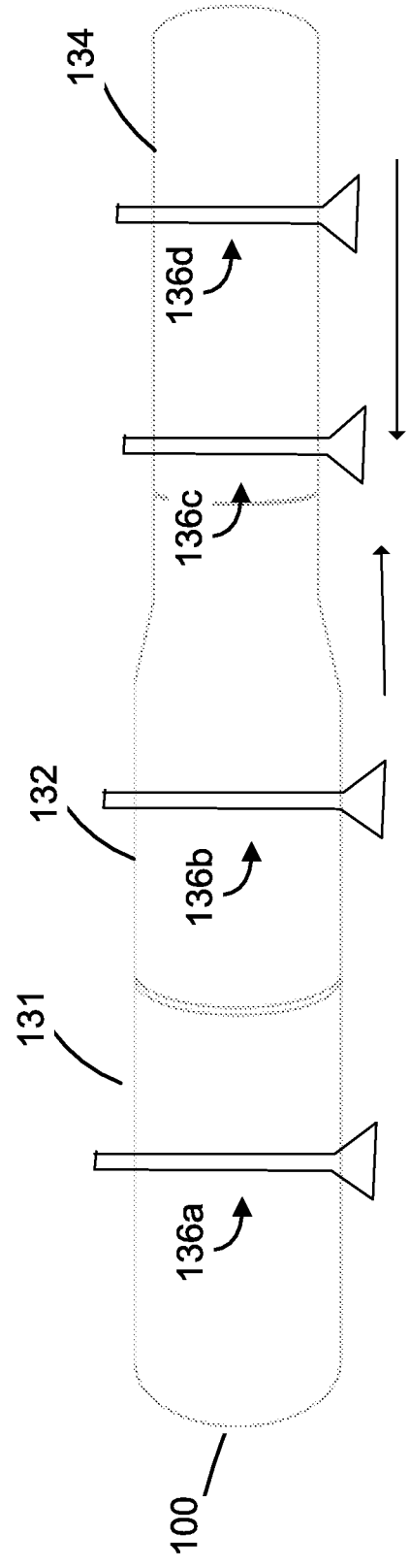

FIGS. 1A-1E and FIG. 6 illustrate an exemplary method of assembling a single shell heat exchange module 100 (FIG. 1D). In this embodiment, the heat exchange module 100 comprises a coil wound heat exchanger (CWHE). CWHEs are often employed for natural gas liquefaction. CWHEs typically contain helically wound tube bundles housed within an aluminum or stainless steel shell that forms a pressure vessel. For liquid natural gas (LNG) service, a CWHE may include multiple tube bundles, each having several tube circuits. Cooling might be provided using any one of a variety of refrigerants, for example, a mixed refrigerant (MR) stream having a mixture of nitrogen, methane, ethane/ethylene, propane, butanes and pentanes is a commonly used refrigerant for many base-load LNG plants. The refrigeration cycle employed for natural gas liquefaction might be a cascade cycle, single mixed refrigerant cycle (SMR), propane-precooled mixed refrigerant cycle (C3MR), dual mixed refrigerant cycle (DMR), nitrogen or methane expander cycles, or any other appropriate refrigeration process. The composition of the MR stream is optimized for the feed gas composition and operating conditions. Located at the top of each tube bundle within the shell is a distributor assembly that distributes the refrigerant over the tube bundle in the space between the shell and the mandrel, which provides refrigeration for the fluids flowing through the tube bundles. An example of a distributor assembly is disclosed in US Publication No. 2016/0209118, which is incorporated by reference as if fully set forth.

FIGS. 1A-D illustrate a first exemplary method of assembling a heat exchange module 100 comprising a CWHE having two coil wound mandrels 114, 124. In order to form each coil wound mandrel, 114, 124, tubing 112 is spirally wound about a mandrel 110. In most applications, multiple circuits of tubing will be wound about the mandrel 110. Each coil wound mandrel 114 has inlets located at or proximate to a first end 110a of the mandrel 110 and outlets located at or proximate to a second end 110b of the mandrel 110.

Figure 1E:
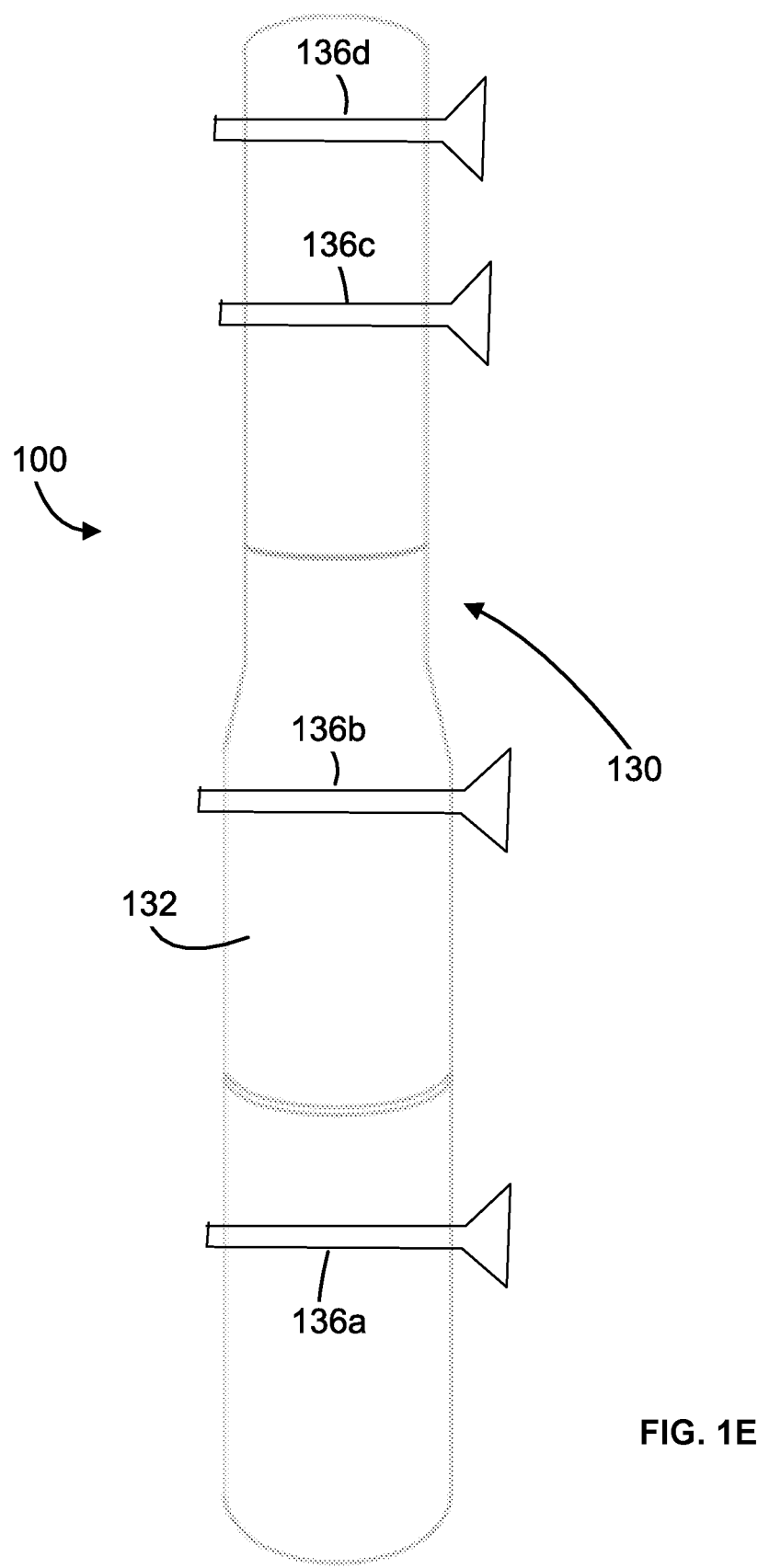

As shown in FIG. 1B, two saddles 136a, 136b are affixed to a first (lower) portion 131 of the pressure vessel shell ("shell"), then the first coil wound mandrels 114 is telescoped (i.e., inserted) into the first portion 131 of the shell through an open top end of the first portion 131 along a longitudinal axis L of the lower portion 131. Similarly, as shown in FIG. 1C, two saddles 136c and 136d affixed to a second (upper) portion 134 of the shell, then the second coil wound mandrel 124 is telescoped into the second portion 134. After both coil wound mandrels 114, 124 have been inserted into the first and second portions 131, 134 of the shell, respectively, the first and second portions 131, 134 are joined to form the pressure vessel shell 132 (See FIG. 1D). After the shell 132 is fully formed and closed, it is transported to a plant site in a horizontal orientation (the orientation shown in FIG. 1D). Upon arrival at the plant site and as shown in FIG. 1E, the heat exchange module 100 is erected into a vertical orientation and installation is completed.

In this exemplary embodiment, the module frame structure that supports the heat exchange module 100 at the plant site is not shown. The module frame could be assembled and affixed to the first and second portions 131, 134 of the shell 130 prior to telescoping of the coil wound mandrels 114, 124, or the module frame could be assembled and affixed to shell 130 after it is erected at the plant site.

A key improvement of the assembly method described in connection with the heat exchange module 100 shown in FIGS. 1A-E is that the saddles 136a-136d are attached each portion 131, 134 of the shell 132 prior to telescoping the coil wound mandrel 114, 124 into each portion, that those saddles 136a-136d are never removed from the shell 132, and that the saddles 136a-136d are attached to the module frame when it is installed. In other words, the saddles 136a-d that are used to support the portions 131, 134 of the shell 132 during telescoping remain part of the structural support of the CWHE throughout the construction and installation process, as well as when the CWHE is operated. Accordingly, the saddles 136a-136d are adapted to provide support for the CWHE during transport (when it is in a horizontal orientation) and after the CWHE has been erected and installed at the plant site (in which the CWHE is in a vertical orientation). This is in contrast to convention assembly methods, in which three different set of saddles are used in the telescoping, transportation, and final installation stages.

As shown in FIGS. 1B & 1C, the saddles 136a are configured to support both horizontal and vertical loads of the CWHE shell 130. To this end, each of saddles 136a-136b includes a frame portion (see frame portions 137a, 137b) that is framed around (i.e., fully encircles) the shell 132 and a base portion (see base portions 138a, 138b) that makes contact with a load bearing surface (e.g., a platform, ground, and/or a module frame) and supports horizontal and vertical loads when the shell 132 is in a horizontal orientation.

Using a single set of saddles throughout the assembly, transportation, and site installation stages provides several advantages. For example, insulation can be installed on shell 132 prior to transportation of the CWHE to the plant site because it won't be disturbed by removal and installation of different saddles and additional connection to the module frame.

Figure 2C:
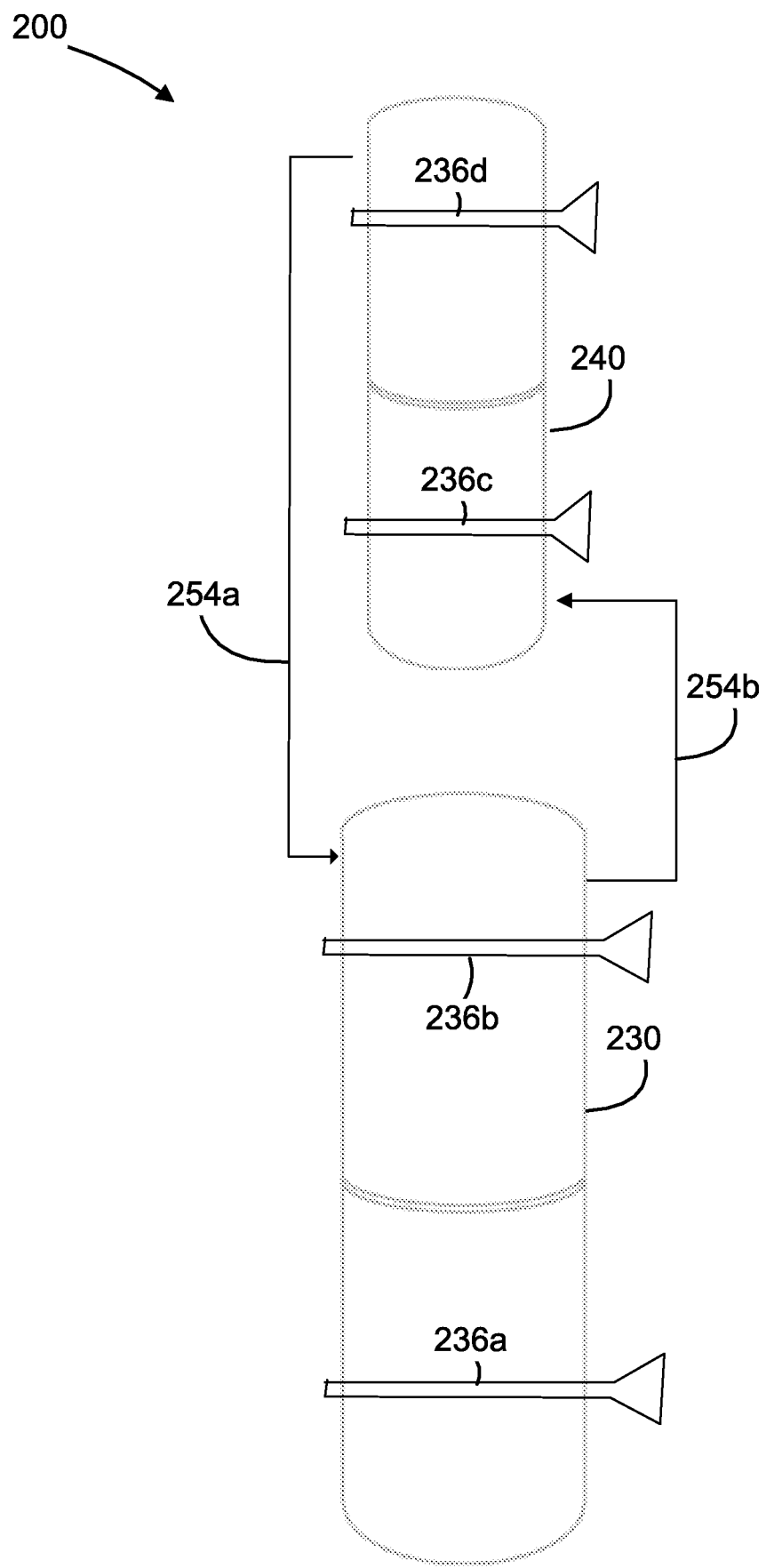

FIGS. 2A-2C illustrate the exemplary assembly method on a heat exchange module 200 having a different configuration. This exemplary embodiment is very similar to the method described in FIGS. 1A-1E, the primary difference being that, in this exemplary embodiment, the CWHE has two separate shells (pressure vessels) 230, 240, each containing one coil wound mandrel 214. In this embodiment, the coil wound mandrels are formed as shown in FIG. 1A. As shown in FIG. 2A, two saddles 236a, 236b are affixed to the first shell 230, then the first coil wound mandrel 210,214 is telescoped into the first shell 230 through an open top end/face. When telescoping is complete, the top end of the shell 230 is sealed by, as shown in FIG. 2B. The process is repeated for the second shell 240. The assembled shells 230, 240 are transported to the plant site in the same manner as the shell 130 and as shown in FIG. 1D. Upon arrival at the plant site and as shown in FIG. 2C, each of the shells 230, 240 are erected into a vertical orientation. Two saddles 236c, 236d are affixed to the second shell 240.

In this exemplary method, the module frame structure that supports the CWHE shells 230, 240 at the plant site is not shown. The module frame could be assembled and affixed to the shells 230, 240 prior to telescoping of the coil wound mandrels or the module frame could be assembled and affixed to shells 230, 240 after the heat exchange module 200 is erected at the plant site. Referring to FIG. 2C, because the CWHE comprises two shells 230, 240, the second shell 240 is positioned atop the first shell 230. Accordingly, if the module frame for each shell 230, 240 is installed prior to transport of the shells 230, 240 to the plant site, the module frame of the second shell 240 is preferably attached to the top of the module frame for the first shell 230. Once the shells 230, 240 are installed at the plant site, external piping 254a-b that interconnects the shells 230, 240 is installed.

FIGS. 3A-3D illustrate another exemplary method of assembling a heat exchange module 300 having a multiple shell CWHE. In this embodiment, the steps of the assembly process are nearly identical to those of the embodiment shown in FIGS. 2A-2C, except the module frames 360a-b are constructed and connected to the saddles 338a-b prior to telescoping the coil wound mandrels 310, 320 into the respective shells 330, 340 (see FIGS. 3A-C). Constructing the module frame 360a and connecting the saddles 338a-b to the module frame 360a prior to telescoping enables external piping 354a-c, piping supports, valves, steps, ladders, standing platforms, and insulation to be installed prior to transportation of the shells 330, 340 to the plant site because the module frame 360a protects the shell 330 and provides attachment points for the elements being installed. In this embodiment, the module frame 360a, the fully formed shell 330, and the saddles 336a-b form a heat exchange module 366a. A second heat exchange module 366b is formed using the same steps as the heat exchange module 366a.

Installation at the plant site is further simplified with this method. The first heat exchange module 366a is erected into a vertical position and the first module frame is affixed to a platform 361 at the plant site (typically a concrete pad or footer). Then the second heat exchange module 366b is erected into a vertical position and the second module frame 366b is mounted to top of the first module frame 366a. Once the shells 230, 240 are installed at the plant site, external piping 354d-e and electrical connections (not shown) that interconnect the shells 330, 340 are installed.

Figure 3A:
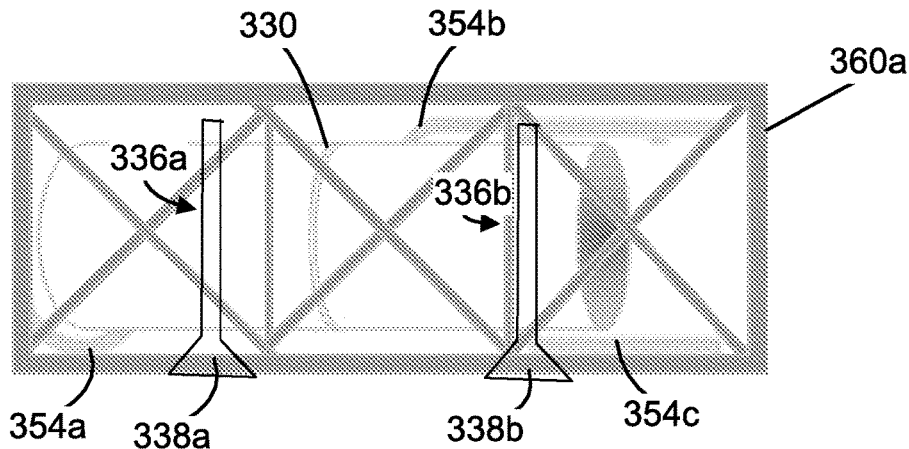
FIGS. 3A-3D illustrates a method of assembling a multiple shell heat exchanger assembly according to one or more embodiments.
Figure 3B:
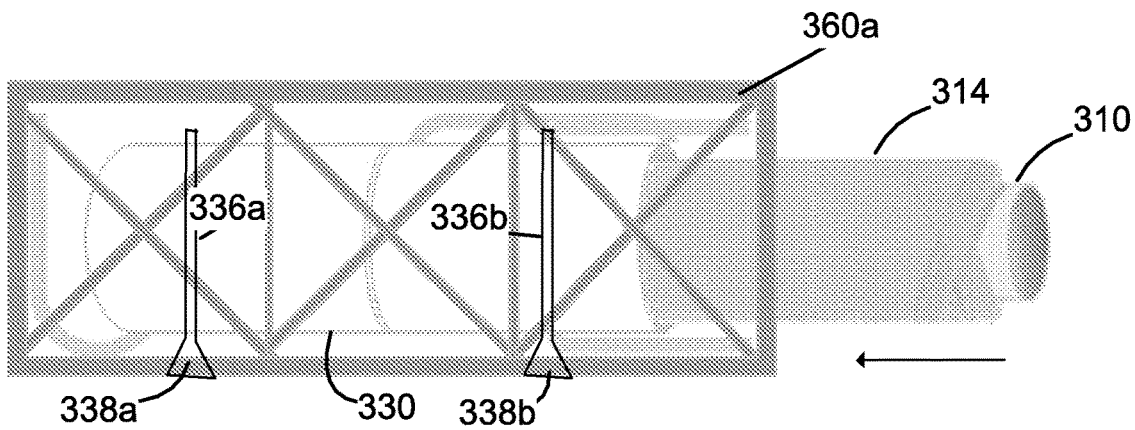
Figure 3C:
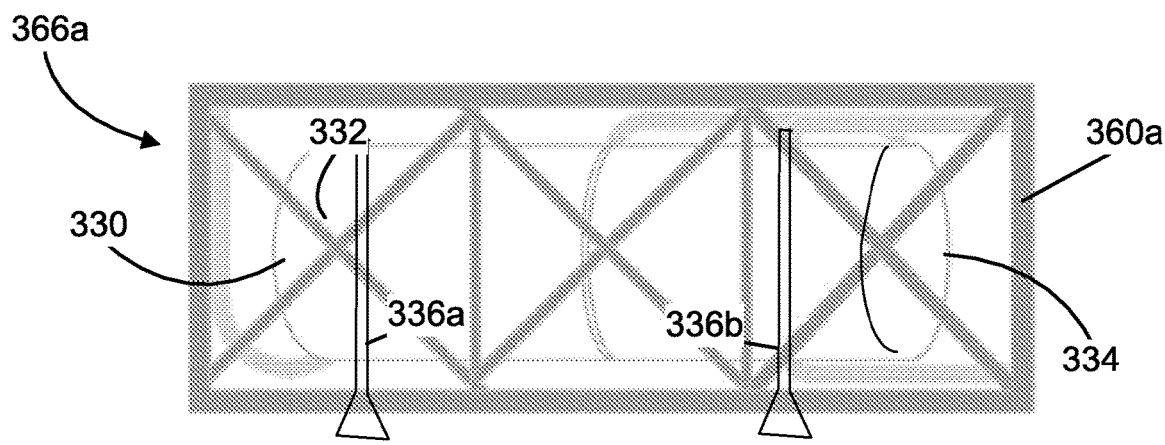
Figure 3D:
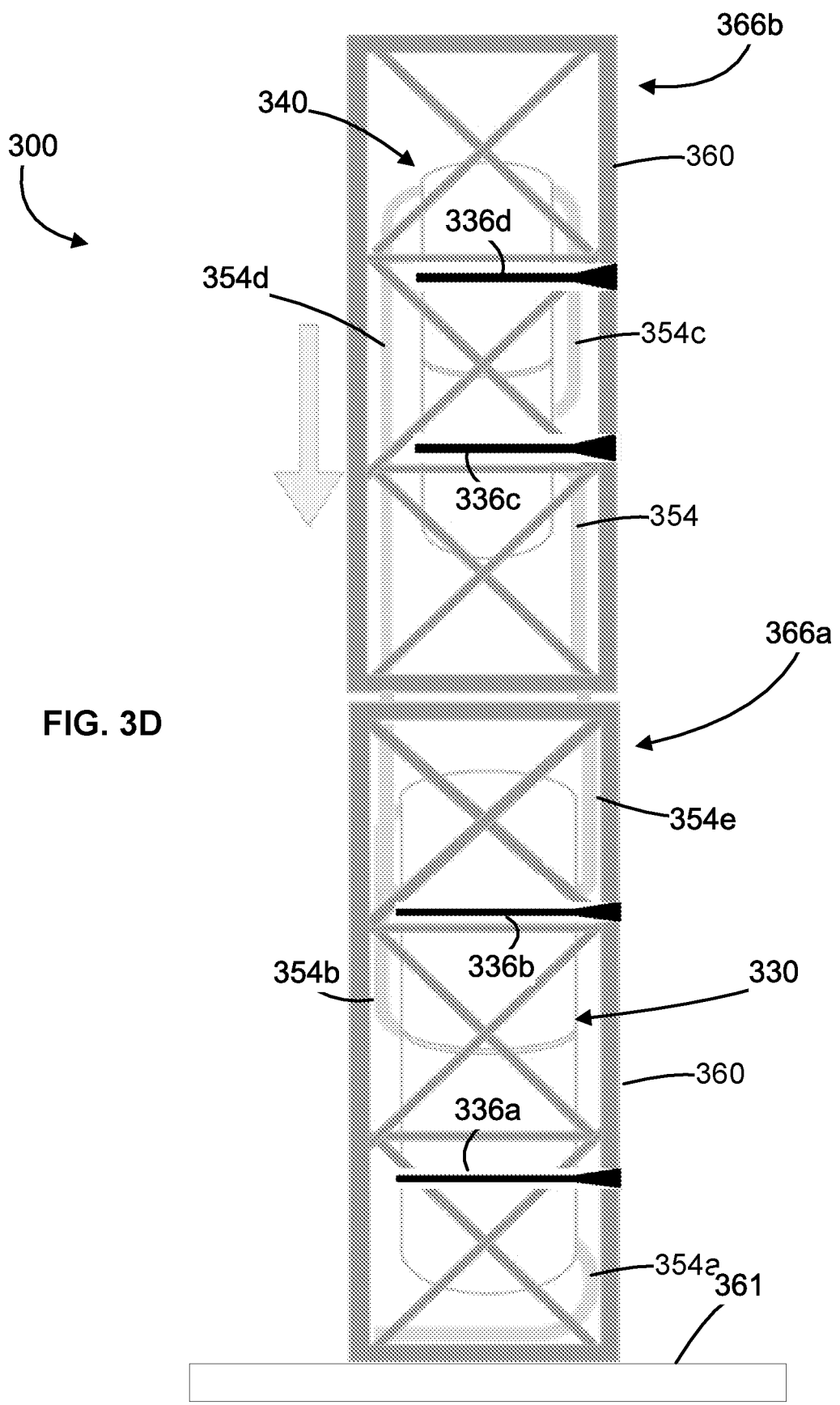

FIG. 3C illustrates another exemplary method for forming a heat exchange module 300. The purpose of this embodiment in which the multiple shell heat exchange module 300 includes two pressure vessels (shells) 330, 340, a first module frame 360a and a second module frame 360b are manufactured. Each module frame 360 includes a plurality of beams 362 and trusses 364 to increase the overall strength of the structure. The plurality of beams 362 that define a frame volume of the module frame 360. Trusses 364, if included, may also define the frame volume since they do not extend beyond the frame volume defined by the beams 362. Thus, the framing of each module frame 360 forms a rectangular frame with a cavity (i.e., frame volume) configured to receive a corresponding pressure vessel. In other words, each module frame 360 is serves as an exoskeleton for its pressure vessel. Multiple module frames and support modules may be manufactured in parallel for each pressure vessel.

As will be described below, the first and second module frames 360a, 360b are configured to be rigidly connected to a corresponding one of the first and second shells 330, 340, thereby forming a first heat exchange module. In this embodiment, the plurality of beams 362 are sized and arranged such that no part of the pressure vessel shell extends outwardly beyond the frame volume. In some embodiments, a pressure vessel, including external piping and wiring is confined within the frame volume, while in other embodiments, some eternal piping and wiring may extend beyond the frame volume. Thus, the module frame 360 itself is a frame enclosure configured to enclose a pressure vessel therein, such that the module frame 360 defines an outermost boundary in each dimension of the corresponding pressure vessel shell. In other words, at the very least, the corresponding pressure vessel shell does not extend beyond the module frame 360 in any dimension. In alternative embodiments, it may be desirable to have the shell protrude from the top of the module frame in order to facilitate connections to other elements of the plant.

In addition, each of the first and second shells 330, 340 is suspended within the frame volume of its corresponding module frame, such that the pressure vessel is supported by the module frame both when in a horizontal orientation and in a vertical orientation. In addition, each saddle 136 is rigidly attached to its corresponding module frame 360 (see e.g., FIG. 3D). Also, when the wound bundle 314 is being telescoped into the shell 330, it may be desirable to pull the wound bundle 314 through the shell 330 using cables that extend through a opening at the bottom end of the shell 330.

Figure 4A:
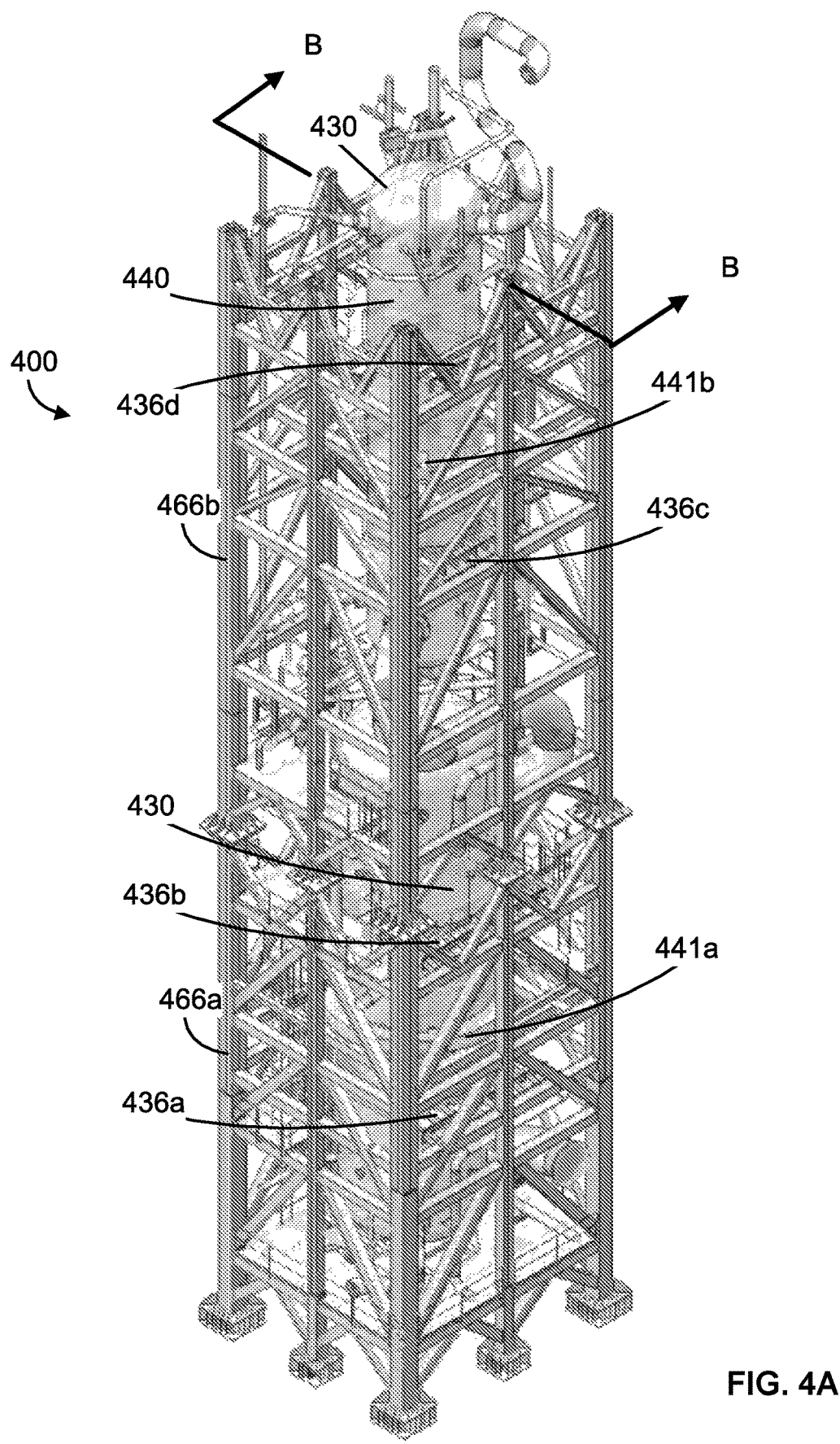
FIG. 4A is an isometric view of a CWHE installed at a plant site.
Figure 4B:
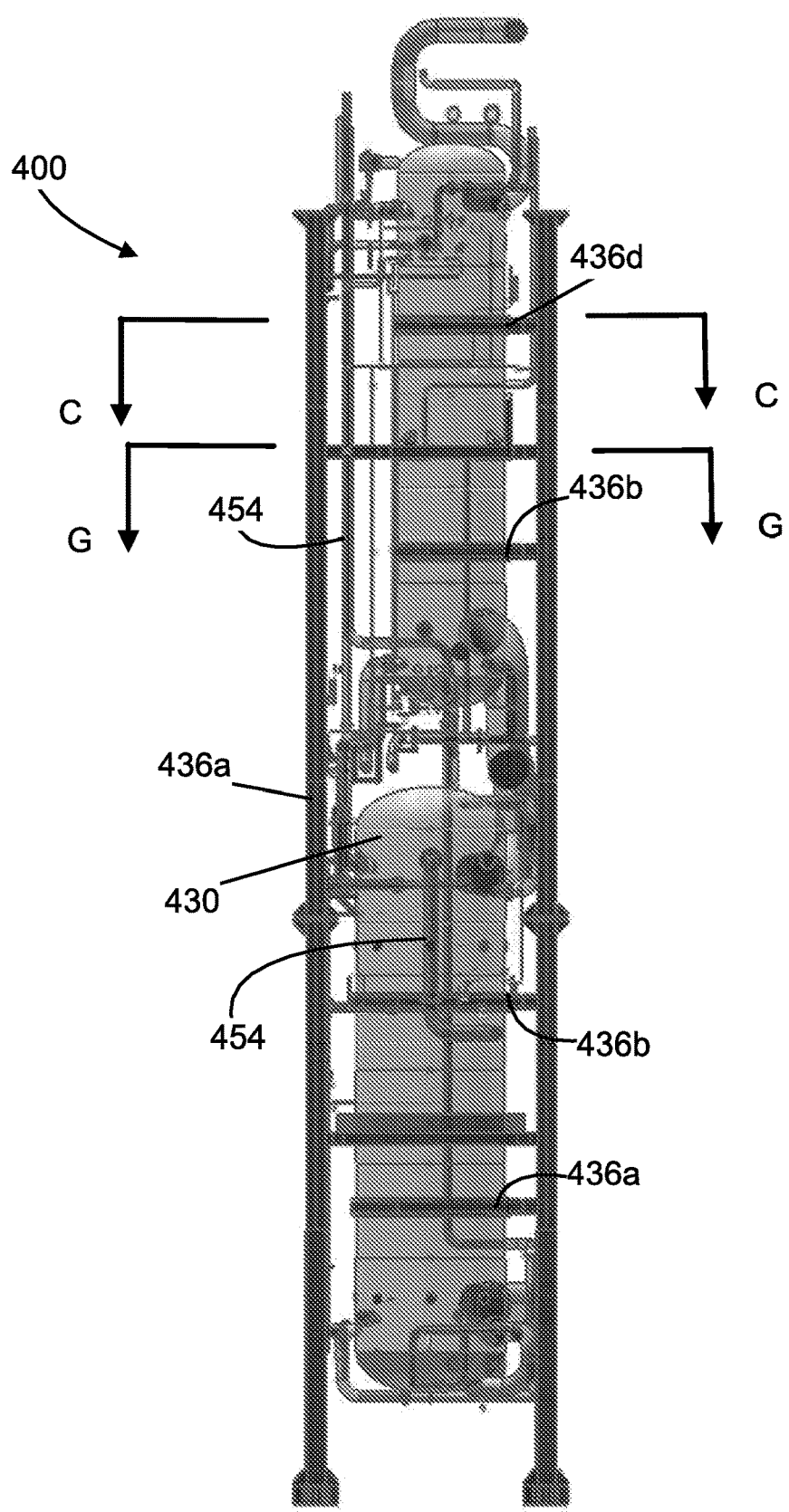
FIG. 4B is a sectional view taken along line B-B of FIG. 4A.

Another exemplary embodiment is shown in FIGS. 4A-4H. In this embodiment, exemplary structures used to execute the assembly methods disclosed in FIGS. 1A-3D are disclosed in greater detail. FIGS. 4A-B show a fully assembled CWHE, which consists of two heat exchange modules 466a, 466b. Each heat exchange module 466a, 466b comprises a shell 430, 440, a module frame 460a, 460b, two saddles 436a-d, and a lug 441a, 441b. As will be described herein, the saddles 436a-d, and the lug 441a, 441b connect the shells 430, 440 to their respective module frames 466a, 466b and are adapted to accommodate for multiple types of loads throughout the assembly process and during operation. The structure of the second heat exchange module 466b will be described in detail herein. The described structure is nearly identical in nature in the first heat exchange module 466a, understanding that some dimensions may be different due primarily to the fact that the shells 430, 440 have different dimensions.

Figure 4C:
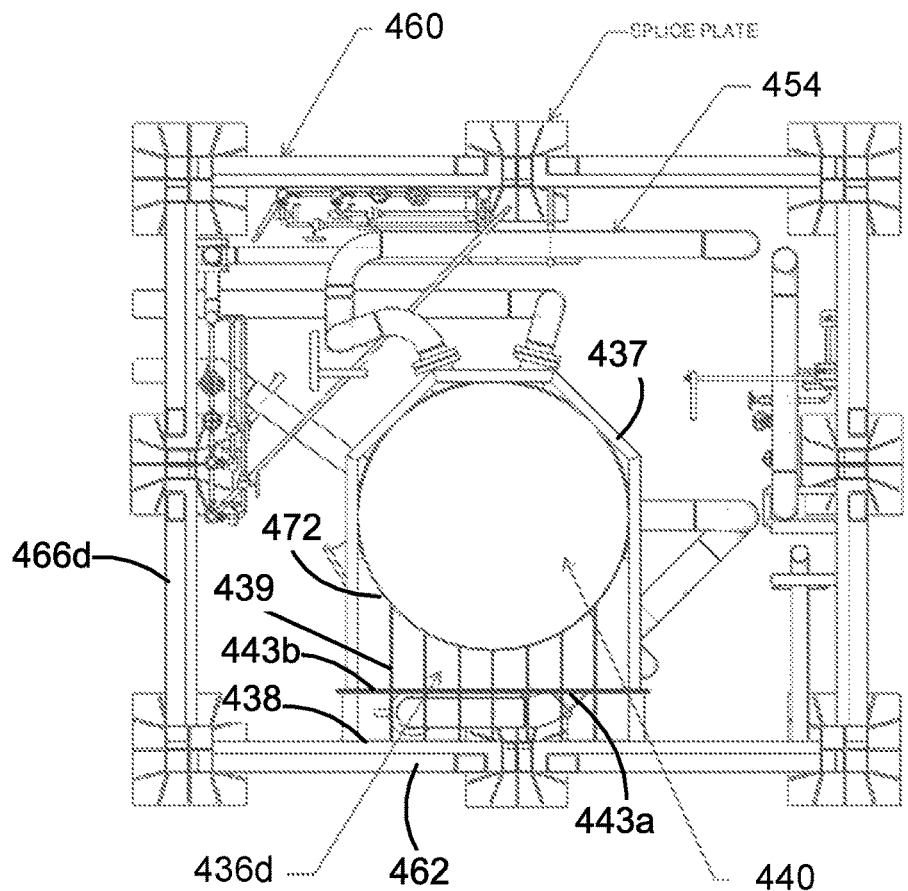
FIG. 4C is a sectional view taken along line C-C of FIG. 4B.
Figure 4D:
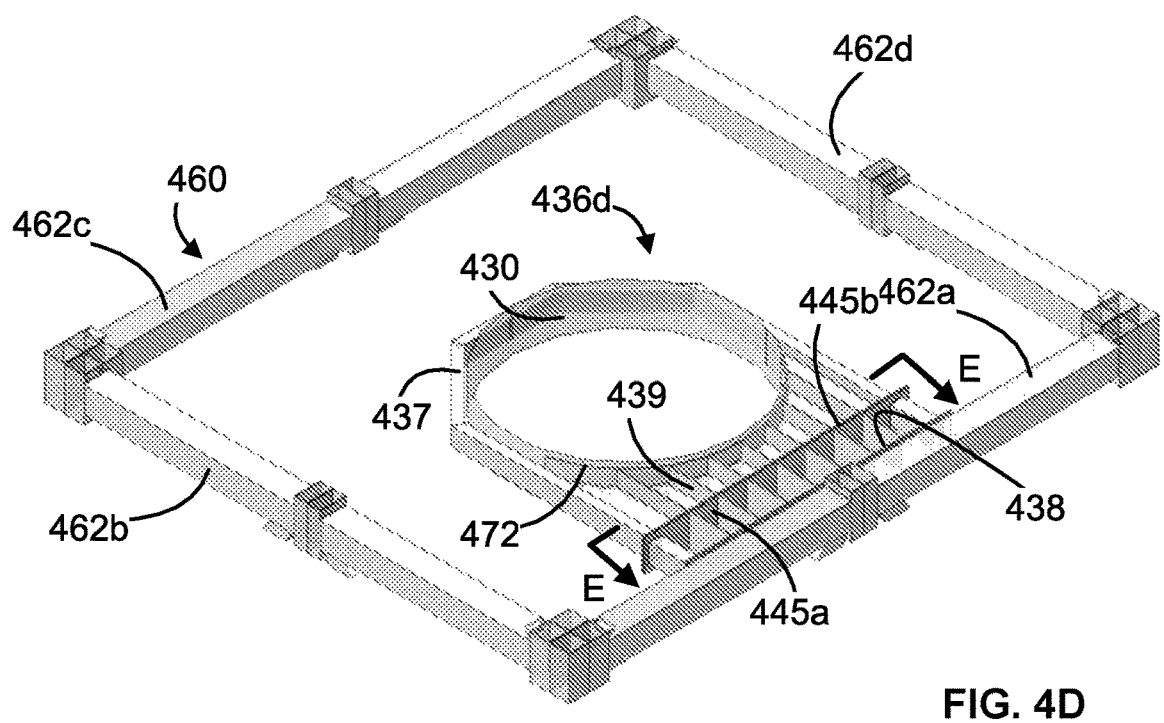
FIG. 4D is a partial isometric view of area C-C of FIG. 4B.
Figure 4E:
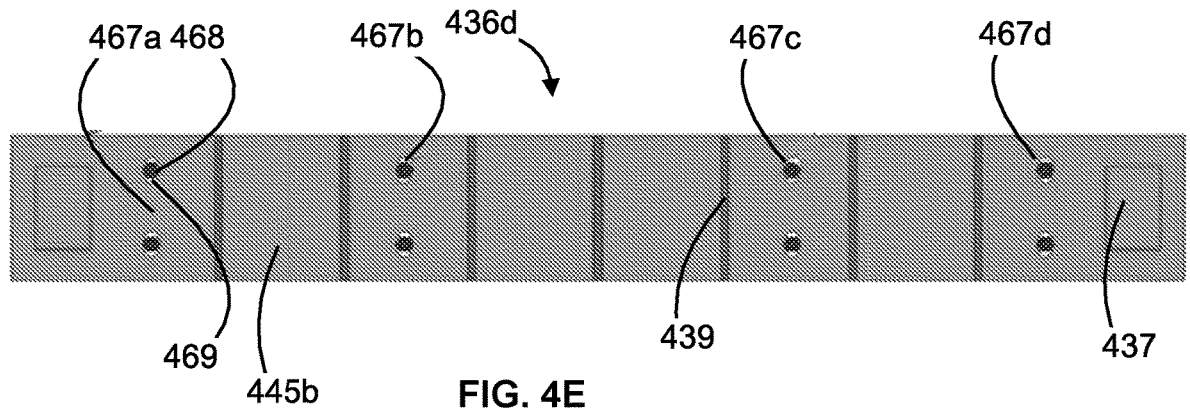
FIG. 4E is an enlarged partial view of area E-E of FIG. 4D.
Figure 4F:
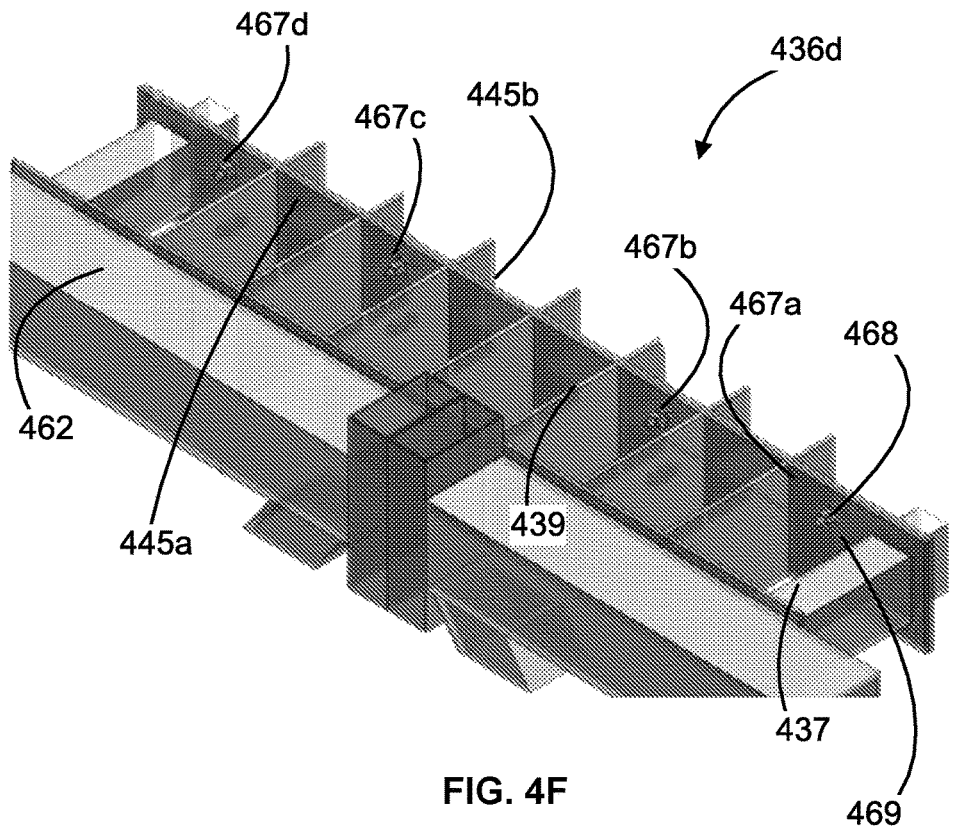
FIG. 4F is a partial isometric view of area E-E of FIG. 4D.

One of the saddles 436d is shown in FIGS. 4C-E. It should be understood that the other saddle 436c of the upper heat exchange module 466b and the saddles 436a-b of the lower heat exchange module 466a have the same structural elements and only differ in dimension/proportions and location. For example, the saddles 436a-b will have larger dimensions due to the larger circumference of the shell 430. The saddle 436d includes a frame portion 437 which encircles the shell 440. The saddle 436d further includes sliding joint plates 438a-b which engage sliding joints 467a-d and connect the saddle 436d with a cross member 462 of the module frame 466d. Optionally, a base plate 438 can be provided at the connection to the cross member 462 to provide additional structural strength.

The saddle 436d further includes a contoured plate 472, which is arcuate and complimentary in shape to the outer surface of the shell 440 along an interface. The interface preferably overlaps at least one quarter and, more preferably, at least one third of the circumference of the shell 440. The saddle 436d further includes a plurality of ribs 439, which extend linearly from the base plate 438, are welded to the sliding joint plates 443a-b, then continue to the contour plate 472 in a direction that is perpendicular to the base plate 438. The saddle 436d is rigidly affixed to the shell 340, either with welds and or fasteners.

Each of the sliding joints 467a-d includes a plurality of bolts 468 (in this embodiment, two bolts per sliding joint), which extend through slots 469 formed in the sliding joint plates 445a-b. Each slot 469 has a length that is significantly greater than the diameter of the bolt 468 that engages that slot 469. The length of the slot 469 is preferably at least 1.5 times (more preferably at least twice) the diameter of the bolt 468. Alternatively, an elongated slot 469 could be formed in one of the sliding joint plates 445a-b and holes that are much closer to the diameter of the bolts 468 could be provided. The joint plates 445a-b, slots 469, and bolts 468 combine to define a shear block. The configuration of the sliding joints 436a-d enables the saddle 436d to move relative to the module frame 466b in a direction parallel to the length of the shell 430, but prevents any other substantial movement of the saddle 436d relative to the module frame 466b. The movement allowed by the slots 469 is preferably sufficient to accommodate thermal contraction and expansion of the shell 440 that is expected to occur when the shell 440 is transition to operating temperature.

Figure 4H:
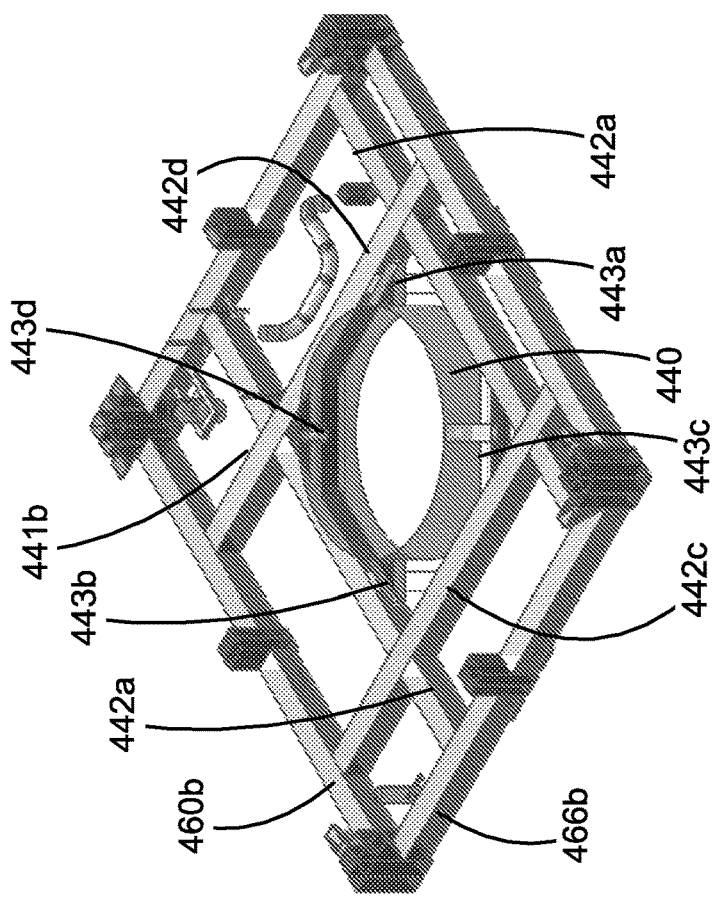
FIG. 4H is a partial isometric view of area G-G of FIG. 4B.
Figure 4G:
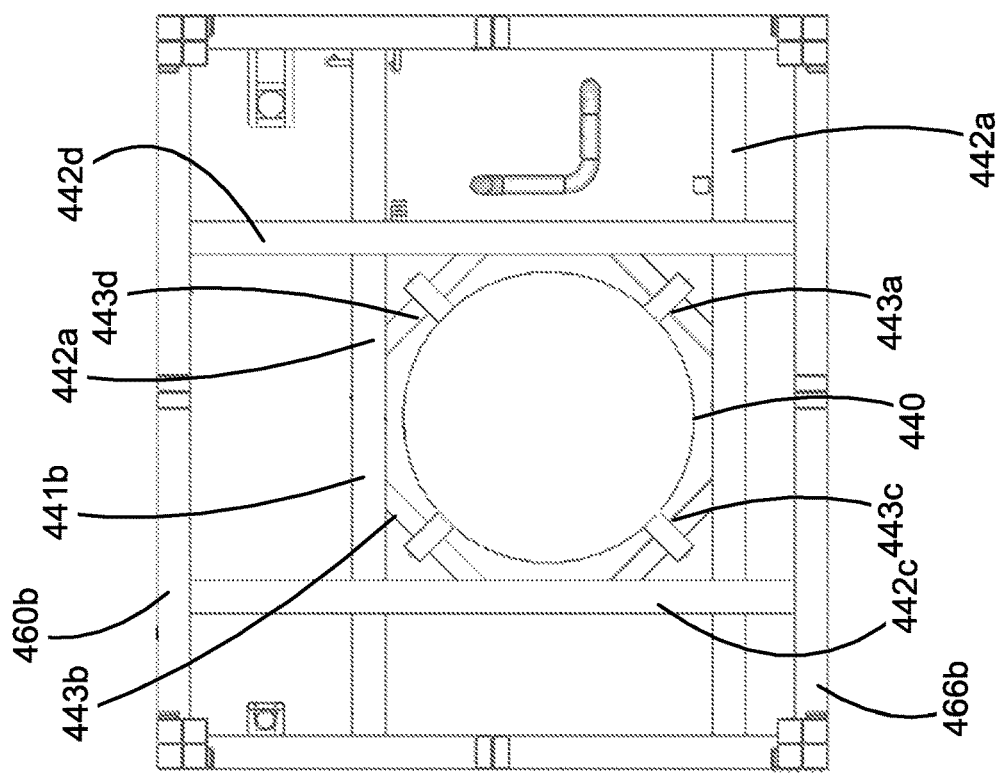
FIG. 4G is a sectional view taken along line G-G of FIG. 4B.

FIGS. 4G-H show the structure of the lug 441b in detail. The lug 441b comprises cross-members 442a-d and beams 443a-d that "box" in the shell 440. The beams 443a-d are each welded to two cross-members 442a-d and are either welded or bolded to the shell 440. The cross-members 442a-d are also preferably welded or bolted to the module frame. This structure rigidly attaches the lug 441b to both the shell 440 and the module frame 460b.

The lug 441b and the two saddles 436c-d attach the shell 440 to the module frame 460b and cooperate to accommodate multiple different types of loads during assembly, transportation, and operation of the heat exchange module 400. When the shell 440 is being assembled and transported (see shell 330, FIGS. 3B-C), the saddles 436*c-d* provide the primary support and stability for the shell 440. When the shell 440 is installed in a vertical orientation at the plant site (see FIG. 4A), the lug 441*b* provides the primary vertical support. The saddles 436*c-d* cooperate with the lug 441*b* to provide support against wind and seismic loads. The sliding joints 467*a-d* and the position of each saddle 436*c-d* allows for thermal expansion of the shell 440.

The preferred location of the lug 441*b* and the saddles 436*c-d* will depend upon a number of factors, including the geometry of the shell 440, its position in the module frame 460*b*, and the location of piping protrusions on the surface of the shell 440. In general, it is preferable that the lug 441*b* be located within 5% (more preferably within 2%) of the center of mass of the shell 440. The lower saddle 436*c* is located between the lug 441*b* and the bottom end of the shell 440 and is preferably within 5% (more preferably within 2%) of the midpoint between the location of the lug 441*b* and the bottom end of the shell 440. The upper saddle 436*c* is located between the lug 441*b* and the top end of the shell 440 and is preferably within 5% (more preferably within 2%) of the midpoint between the location of the lug 441*b* and the top end of the shell 440. By way of example, if the shell 440 has a length of 10 meters and a center of mass at its midpoint, the lug 441*b* would be preferably located within 0.5 meters, and more preferably within 0.2 meters, of the midpoint.

As noted in previous embodiments, each shell 430, 440 is contained within a perimeter defined by the cross members 462*a-d* (see FIG. 4D) of the module frame 466*a-b*. This provides protection for the shells 430,440 during construction and transport. It should be understood that a shell 430, 440 may extend beyond an end of the frame module 466*a-b*, such at the top of shell 430, which extends beyond the upper end of its frame module 466*b*. This most common for a shell of a single-shell heat exchanger or the uppermost shell of a multiple-shell heat exchanger.

The methods described herein allow for all internal piping and almost all external piping to the shells to be completed prior to the completion of the coil wound exchanger bundle. In addition, valves and instruments can be installed and insulated before the long lead bundles are telescoped into the shells. Additionally, this method can eliminate the need for temporary shipping saddles. In addition, the use of multiple pressure vessels including any combination thereof within the module frames can be accommodated. Furthermore, once at the operation site the final piping connections are made and the exchanger modules can be made operational.

Figure 5:
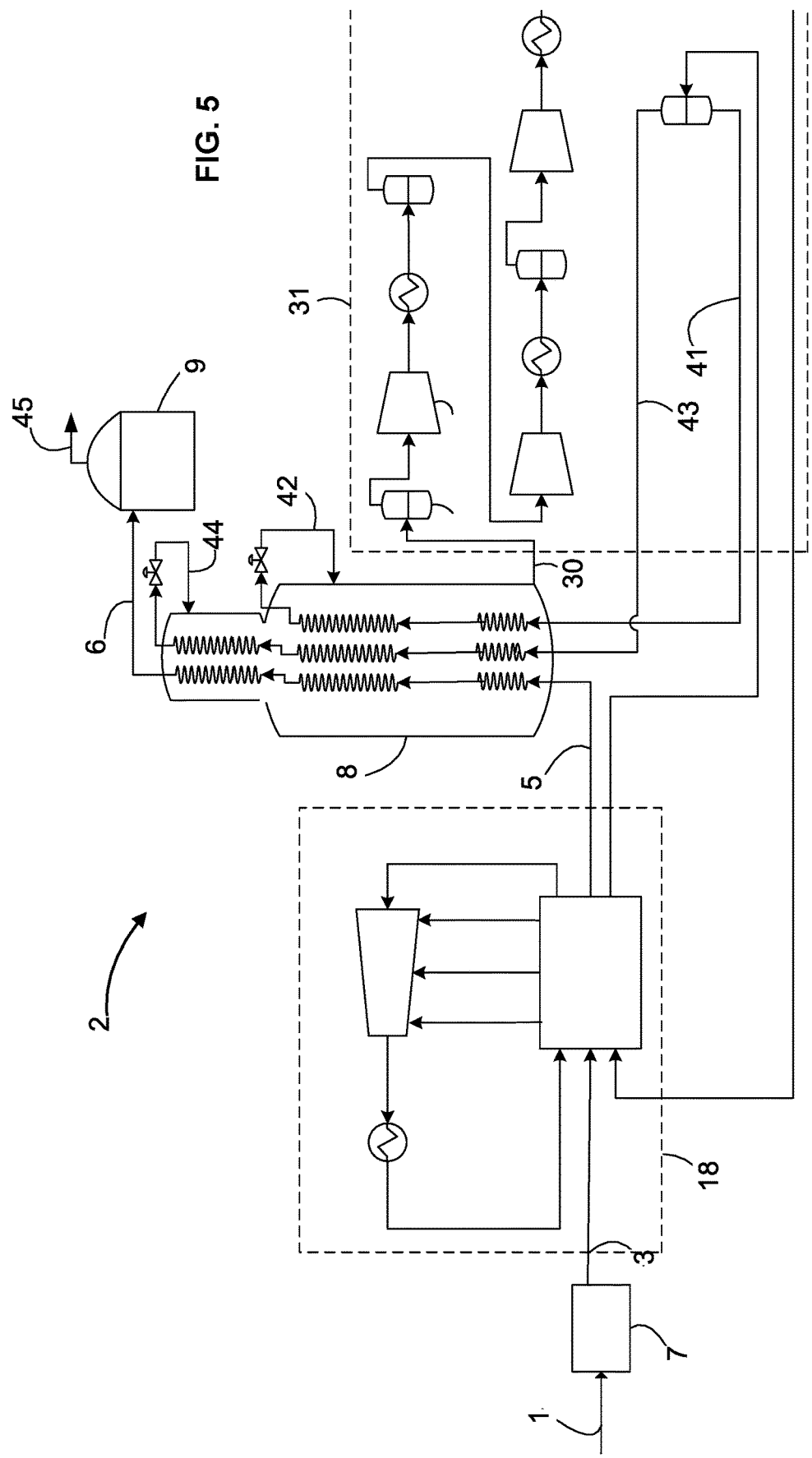
FIG. 5 is a block diagram of an exemplary natural gas liquefaction system, with which the heat exchanger assembly that could be used according to one or more embodiments.

As noted above, the heat exchange modules 100, 200, 300, 400 disclosed herein are most commonly used as part of a natural gas liquefaction plant (system). An exemplary natural gas liquefaction system 2 is shown in FIG. 5. Referring to FIG. 5, a feed stream 1, which is preferably natural gas, is cleaned and dried by known methods in a pre-treatment section 7 to remove water, acid gases such as CO2 and H2S, and other contaminants such as mercury, resulting in a pre-treated feed stream 3. The pre-treated feed stream 3, which is essentially water free, is pre-cooled in a pre-cooling system 18 to produce a pre-cooled natural gas stream 5 and further cooled, liquefied, and/or sub-cooled in a CWHE 8 (which could be heat exchange module 100 or 200) to produce an LNG stream 6. The LNG stream 6 is typically let down in pressure by passing it through a valve or a turbine (not shown) and is then sent to LNG storage tank 9. Any flash vapor produced during the pressure letdown and/or boil-off in the tank is represented by stream 45, which may be used as fuel in the plant, recycled to feed, or vented.

The pre-treated feed stream 1 is pre-cooled to a temperature below 10 degrees Celsius, preferably below about 0 degrees Celsius, and more preferably about −30 degrees Celsius. The pre-cooled natural gas stream 5 is liquefied to a temperature between about −150 degrees Celsius and about −70 degrees Celsius, preferably between about −145 degrees Celsius and about −100 degrees Celsius, and subsequently sub-cooled to a temperature between about −170 degrees Celsius and about −120 degrees Celsius, preferably between about −170 degrees Celsius and about −140 degrees Celsius. CWHE 8 is a coil wound heat exchanger with three bundles. However, any number of bundles and any exchanger type may be utilized.

Refrigeration duty for the CWHE 8 is provided by a mixed refrigerant that is cooled and compressed in a compression system 31. The warm mixed refrigerant is withdrawn from the bottom of the CWHE 8 at stream 30, cooled and compressed, then reintroduced into the tube bundles through streams 41, 43. The mixed refrigerant is withdrawn, expanded, and reintroduced in the shell side of the CWHE 8 via streams 42, 44. Additional details concerning the natural gas liquefaction system can be found in US Publication No. 2018/0283774, which is incorporated herein by reference as if fully set forth. The system 2 shown in FIG. 5 is identical to the system shown in FIG. 1 of US Publication No. 2018/0283774.

In view of the of the disclosed embodiments, the integration of the pressure containing shell (i.e., pressure vessel) into the module frame inclusive of piping outside as well as internal to the CWHE reduces manufacturing time, cost, and field work through simultaneous mechanical work and winding of the bundle. Once the wound bundle is completed it can be telescoped into the pressure shell that is already disposed within the module frame for final assembly. This method allows for completion of electrical and mechanical work, including both electrical systems and piping systems (both internal and external) within the module frame prior to completion of manufacturing of the mandrel with the wound bundle. It also allows for the manufacturing of the pressure shell and assembly to be completed at different sites to optimize labor availability and cost. In addition, the use of saddles that are configured to support both horizontal and vertical loads of the pressure vessels aids in: performing the electrical and mechanical work on the pressure shell within the module frame, supporting the horizontal pressure vessel during shipping of the pressure vessel within the module frame, and supporting the erected pressure vessel within the module frame at the operation site, including during operation.

Figure 6:
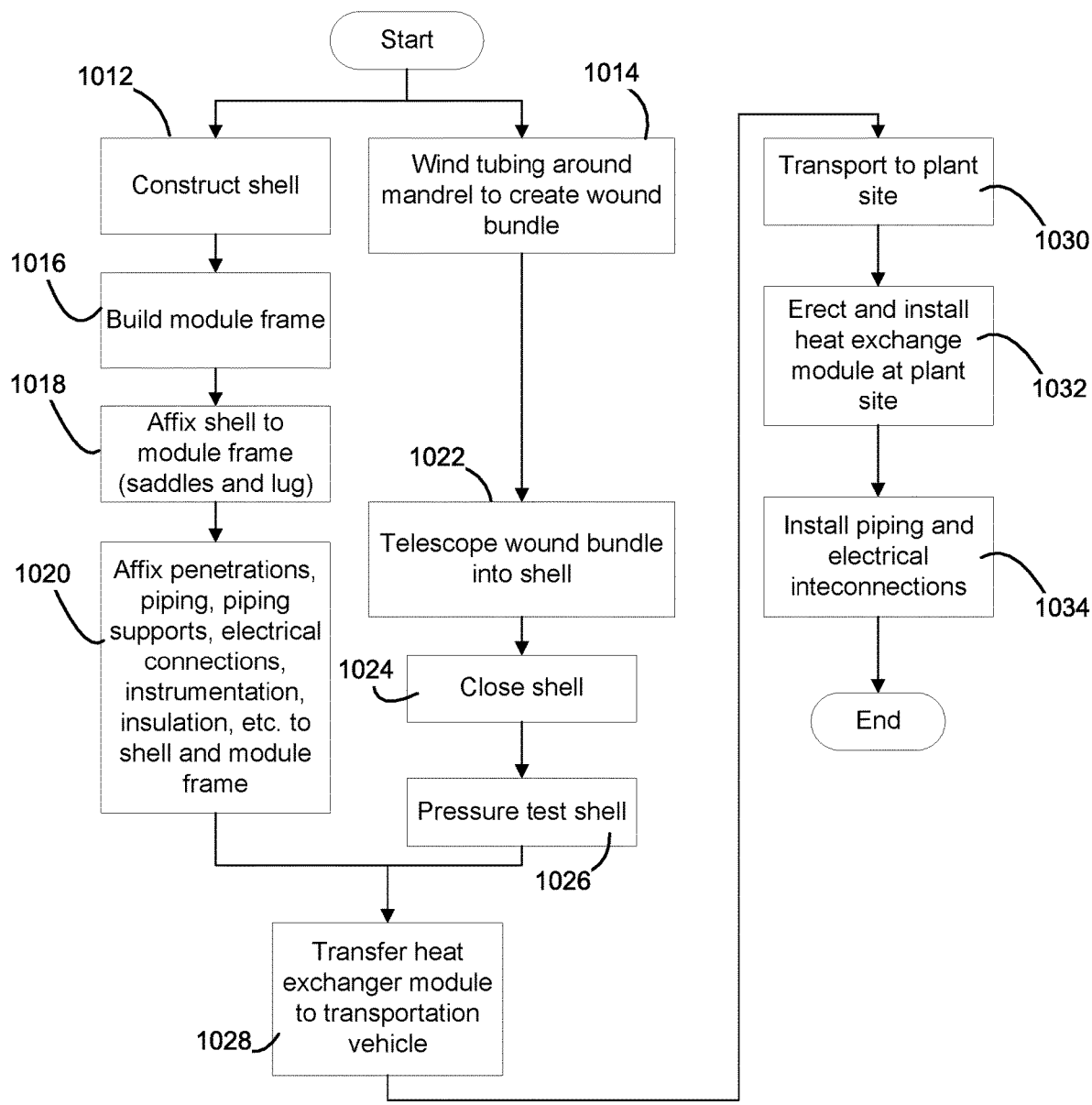
FIG. 6 is a flow chart showing the steps of an exemplary methods described herein.

FIG. 6 provides a flow diagram of an exemplary method of assembly, transport, and installation of a heat exchange module in accordance with the exemplary embodiments described herein. The process commences with construction of the shell (step 1012) and winding of tubes around the mandrel to form a wound bundle (step 1014). When the shell has been formed, the module frame, including the saddles and lug, is constructed (step 1016) and attached to the shell (step 1018). When the wound bundle is finished, it is telescoped (inserted) into the shell (step 1022) and the top end of the shell is closed (step 1024).

Constructing and attaching the module frame to the shell prior to telescoping the wound bundle into the shell provides a number of benefits. The structural stability of the module frame reduces stress on the shell during telescoping, transition to transportation, during transportation, and during erection of the shell at the plant side. In some applications, this will enable the shell to be thinner (and therefore lighter) and less costly. For example, the bracing force used to stabilize the shell during the telescoping step 1022 can be applied to the module frame instead of being applied directly to the shell. Similarly, when the shell is being moved (lifted) in preparation for transportation (step 1028) and erected and installed at the plant site (step 1032), the moving/lifting forces can be applied to the module frame instead of being applied directly to the shell. In addition, in installations where the heat exchanger consists of multiple shells (see FIGS. 2A-C and 4A-H), the upper shell (e.g., shell 440 of FIG. 4A) can be installed by simply bolting its module frame to the module frame of the lower shell (e.g., shell 430 of FIG. 4A).

Constructing and attaching the module frame to the shell prior to telescoping also enables some process steps that are required to be performed in series using conventional methods to be performed in parallel. For example, piping penetrations, piping supports, electrical connections, instrumentation, and insulation can be installed on the shell (step 1020) prior to or in parallel with the telescoping step 1022. Under conventional methods, these elements could not be installed until after the shell is installed at the plant site. This improvement, not only shortens the overall process length, it also enables additional process steps to be performed in an indoor environment instead of being performed outdoors at a plant site. In addition, it enables the option to pressure test the shell (step 1026) under shop conditions and before transport to the plant site (step 1030). Enabling a significant portion of the piping and electrical work can be done prior to transportation reduces the steps that need to be performed at the plant site. In many cases, the only piping and electrical connections that must be performed at the plant site are those that interconnect the shell with another shell or with other elements of the plant (step 1034).

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. Thus, with regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

The invention claimed is:

1. A method comprising:
   (a) forming a first mandrel;
   (b) forming a first wound bundle onto the first mandrel to form a first coil wound mandrel by winding tubing around the first mandrel;
   (c) providing a first portion of a first heat exchanger shell, the first portion having a first open face and a first shell longitudinal axis that extends parallel to a largest dimension of the first heat exchanger shell;
   (d) attaching the first portion of the first heat exchanger shell to a first module frame with at least two connecting members that are rigidly attached to the first heat exchanger shell to form a first heat exchange module, the first module frame comprising a plurality of columns connected by cross-members;
   (e) after performing step (d), telescoping the first coil wound mandrel into the first portion of the first heat exchanger shell through the first open face while the first shell longitudinal axis is in a substantially horizontal orientation;
   (f) after performing step (e), closing the first open face of the first heat exchanger shell;
   (g) after performing step (f), transporting the first heat exchange module to a plant site; and
   (h) after performing step (g), mounting the first heat exchange module at the plant site with the first shell longitudinal axis in a substantially vertical orientation, wherein the first heat exchange module is suspended in a fixed position within the first module frame by the at least two connecting members.

2. The method of claim 1, wherein the at least two connecting members comprises at least one saddle and step (d) further comprises connecting the at least one saddle to the first module frame with a plurality of joints that enable the at least one saddle to move relative to the first module frame in a direction that is parallel to the first shell longitudinal axis while preventing movement of the at least one saddle relative to the first module frame in directions that are not parallel to the first shell longitudinal axis.

3. The method of claim 1, wherein the at least two connecting members comprises at least two saddles and step (d) further comprises connecting the at least two saddles to the first module frame with a plurality of joints that enable each of the at least two saddles to move relative to the first module frame in a direction that is parallel to the first shell longitudinal axis while preventing movement of each of the at least two saddles relative to the first module frame in directions that are not parallel to the first shell longitudinal axis.

4. The method of claim 1, wherein the at least two connecting members comprise at least one lug and step (d) further comprises rigidly affixing the at least one lug to the first module frame.

5. The method of claim 1, further comprising:
   (i) before performing step (g), installing on the first heat exchange module at least one selected from the group of: piping, piping supports, valves, instrumentation, electrical systems, steps, ladders, standing platforms, and insulation.

6. The method of claim 1, further comprising:
(j) before performing step (g), installing on the first heat exchange module at least one selected from the group of: piping, piping supports, valves, steps, ladders, standing platforms, and insulation.

7. The method of claim 1, further comprising, performing step (i) before finishing step (e).

8. The method of claim 1, further comprising:
(k) before performing step (g), insulating an outer surface of the first heat exchange module.

9. The method of claim 1, wherein step (h) comprises rigidly attaching the first module frame to a platform at the plant site.

10. The method of claim 1, wherein step (d) further comprises configuring the first module frame to contain the attached first portion of the first heat exchanger shell within a frame perimeter defined by the plurality of columns of the first heat exchange module.

11. The method of claim 1, further comprising:
(l) providing a cable opening in the first heat exchanger shell at an end that is distal to the first open face and passing a cable through the cable opening;
wherein step (e) further comprises drawing the first coil wound mandrel into the first heat exchanger shell using the cable during at least a portion of step (m).

12. The method of claim 1, further comprising:
(m) repeating steps (a) through (f) to form a second heat exchange module;
(n) after performing step (m), transporting the second heat exchange module to a plant site; and
(o) after performing step (n), mounting the second heat exchange module atop the first heat exchange module at the plant site with a second shell longitudinal axis of the second heat exchange module in a substantially vertical orientation, wherein the second heat exchange module is suspended in a fixed position within a second module frame of the second heat exchange module by the at least two connecting members.

13. The method of claim 12, further comprising:
(p) installing at least one conduit that provide a fluid flow connection between the shell of the first heat exchange module and the shell of the second heat exchange module.

14. The method of claim 1, further comprising:
(q) during the performance of step (e), bracing the first heat exchanger shell against a force applied to the first heat exchanger shell by the telescoping the first coil wound mandrel solely by applying a bracing force to the first module frame.

15. The method of claim 1, further comprising:
(r) pressure testing the first heat exchanger shell prior to performing step (g).

16. The method of claim 1, further comprising:
(s) forming a second mandrel;
(t) forming second coil wound mandrel by winding tubing around the second mandrel;
(u) providing a second portion of the first heat exchanger shell, the second portion having a second open face and a second shell longitudinal axis that extends parallel to the largest dimension of the second heat exchanger shell;
(v) attaching the second portion of the first heat exchanger shell to a second module frame with at least two connecting members that are rigidly attached to the second portion of the first heat exchanger shell, the first module frame comprising a plurality of columns connected by cross-members; and
(w) telescoping the first coil wound mandrel into the first portion of the first heat exchanger shell through the first open face while the first shell longitudinal axis is in a substantially horizontal orientation;
wherein step (f) comprises, after performing steps (e) and (w), closing the first open face of the first heat exchanger shell by joining the first portion of the first heat exchanger shell to the second portion of the first heat exchanger shell and joining the first module frame to the second module frame to form the first heat exchange module.

17. A method comprising:
(a) suspending a coil wound heat exchanger in a substantially vertical orientation above a platform with at least one saddle and at least one lug that are each rigidly connected to the coil wound heat exchanger and are each connected to a module frame;
(b) rigidly affixing the at least one lug to the module frame;
(c) enabling the at least one saddle to move relative to the module frame in a direction parallel to a longitudinal axis of the coil wound heat exchanger when the coil wound heat exchanger transitions from ambient temperature to an operating temperature;
(d) telescoping a coil wound mandrel into a shell of the coil wound heat exchanger with the shell of the coil wound heat exchanger in a substantially horizontal orientation; and
(e) supporting the coil wound heat exchanger during step (d) using the at least one saddle and at least one lug that suspend the coil wound heat exchanger in step (a).

* * * * *